2,865,651

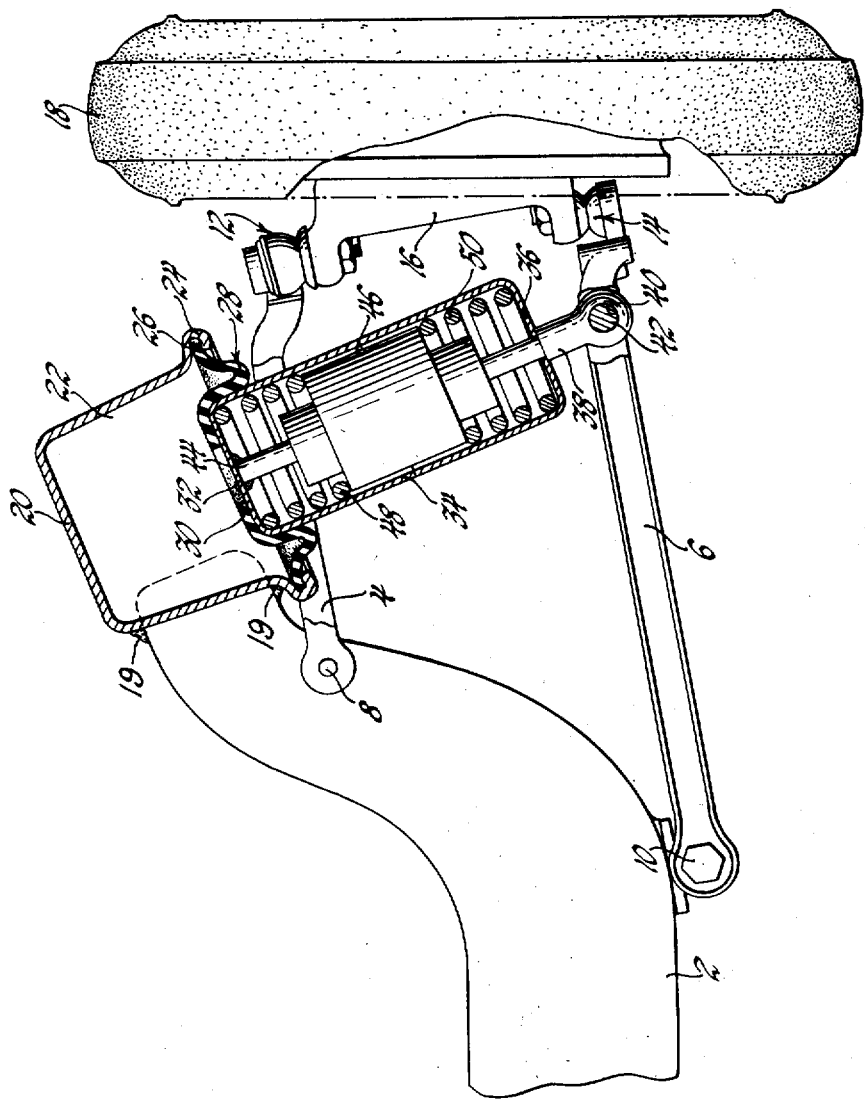

COMBINED WHEEL HOP DAMPER AND AIR SPRING SUSPENSION

Charles A. Chayne, Bloomfield Township, and Von D. Polhemus, Franklin, Mich., assignors to General Motors Corporation, Detroit, Mich., a corporation of Delaware Application December 30, 1954, Serial No. 478,782

5 Claims. (Cl. 280—124)

This invention relates to vehicle suspension and more particularly to air spring suspension.

In the past, numerous forms of pneumatic springs have been proposed for use in vehicle suspension. While air springs possess inherent advantages over other types of springs, certain operating characteristics common to all types of vehicle suspension remain unaffected. Hence, the numerous basic pneumatic spring structures suggested in the prior art have, in general, provided very little, of any, improvement in control of such characteristics as high frequency wheel hop and lower frequency oscillations caused by road surface irregularities, braking, etc.

It is an object of the present invention to provide an air spring suspension having means incorporated therein for reducing or eliminating high frequency wheel oscillation.

Another object is to provide a suspension of the stated character wherein the air suspension and wheel hop controlling mechanism are structurally interdependent.

A further object is to provide a vehicle suspension wherein the vehicle wheel is supported for vertical swinging movement and has pivotally connected thereto a cylinder structure which is reciprocable in an air chamber formed on the vehicle frame to resiliently support the frame relative to the wheel, the cylinder having formed interiorly thereof mechanism capable of counteracting high frequency wheel hop.

These and other objects and advantages of the invention will become more fully apparent as reference is had to the accompanying drawing wherein:

Fig. 1 is a front elevational view, partly in section, of a vehicle front suspension illustrating the form and arrangement of the invention.

Referring now to the drawing, there is illustrated the left front portion of a vehicle chassis wherein the reference numeral 2 indicates a drop center front frame cross member. It will be understood the right front portion of the chassis is identical with the left and therefore the following description applies equally to both sides of the vehicle. Extending transversely from cross member 2 are vertically spaced wishbone type upper and lower wheel control arms 4 and 6, the inner ends of which are pivotally connected to cross member 2 at 8 and 10. At their outer ends, arms 4 and 6 are connected by ball joint assemblies 12 and 14 to a wheel steering knuckle 16 upon which is rotatably mounted a dirigible road wheel 18. At its outer extremity, cross member 2 has attached thereto, as by welding 19, an inverted cup-shaped member 20 which provides an air spring chamber 22. At its lower peripheral edge, member 20 is formed with a radially offset generally U-shaped circumferential flange 24 in which is secured the outer peripheral portion 26 of an annular resilient diaphragm 28. The inner peripheral portion 30 of diaphragm 28 in turn is bonded to the upper wall 32 of an elongated generally vertically extending hollow cylindrical piston 34. The lower wall 36 of cylinder 34 is provided with a depending relatively short shaft portion 38 having a transversely extending aperture 40 formed therein. Aperture 40 is adapted to receive a transversely extending pin 42 carried by lower control arm 6. It will thus be seen that upper wall 32 of cylindrical member 34 and diaphragm 28 cooperate to close chamber 22 and confine air therein. It will also be seen, upon vertical elevation of wheel 18, cylinder 34 will be displaced upwardly by the swinging movement of lower control arm 6 and extend interiorly of chamber 22, causing the air confined therein to be progressively compressed. Because of the annular form of diaphragm 28, the upper end of cylinder 34 is maintained in substantially concentric relation with member 20 and no additional guiding means need be provided.

In accordance with another feature of the invention, the hollow cylindrical piston 34 has formed interiorly thereof a concentric guide rod 44 upon which is slidably mounted an annular weight 46. Disposed between either end of weight 46 and the adjacent end wall 32 or 36 of cylinder 34 are a pair of coil springs 48 and 50 which act to normally yieldably confine weight 46 in an intermediate position. Springs 48 and 50 are turned to cause weight 46 to oscillate out of phase with the frequency of oscillation of wheel 18 and thus provide a dynamic absorber which tends to counteract high frequency wheel hop. Because of wide variations in wheel hop amplitude, it is desirable that the amplitude of oscillation of weight 46 be damped to increase the tolerance of the mechanism to the wide range of operating conditions encountered. To accomplish damping in accordance with another feature of the invention, the diametral clearance between the outer periphery of weight 46 and the inner periphery of cylinder 34 is calibrated to a predetermined value restricts the rate at which the air trapped at opposite ends of the cylinder by the weight may be transferred back and forth as the weight oscillates in the cylinder. It has been found that by providing suitable clearance any desired degree of damping may be attained.

While the present invention has been described in connection with an elementary form of air spring, it will be understood that the particular air suspension structure shown is for illustrative purposes only and that the invention may be easily adapted to other forms of air suspensions of considerably more complex construction and mode of operation. It will also be noted that the provision of a conventional shock absorber has been omitted. In this connection, it should be pointed out that because of the reduction in high frequency oscillations accomplished by the present invention, shock absorbers, if needed at all, will be necessary only for control of relatively low frequency oscillations or ride control, and may be mounted in any convenient location.

From the foregoing, it will be seen that a simple and inexpensive wheel suspension structure has been provided. The invention not only provides improved riding and operating characteristics but, in addition, permits the arrangement of the necessary structure in an exceptionally compact relationship.

While but one embodiment of the invention has been shown and described, it will be apparent that numerous changes and modifications may be made therein.

It is, therefore, to be understood that it is not intended to limit the invention to the embodiment shown but only by the scope of the claims which follow.

We claim:

1. In a vehicle suspension, the combination of a frame, a wheel, lever means connecting said wheel to said frame, a cylinder having an open end, means rigidly connecting said cylinder to said frame, an elongated piston connected to said lever means and movable in and out of said cylinder, resilient annular means forming a leak-proof juncture between said open end and the upper end of said piston whereby air confined in said cylinder resiliently resists movement of said piston in one direction, a closed cylindrical chamber formed interiorly of said piston, and dynamic absorber means movable in said chamber to counteract high frequency oscillation of said wheel.

2. In a vehicle suspension, the combination of a frame, a road wheel, a pair of vertically spaced levers connecting said wheel to said frame, a cylinder having an open end, means rigidly connecting said cylinder to said frame vertically adjacent said levers, a hollow piston connected to one of said levers and movable in and out of said cylinder, a resilient annular diaphragm connecting said open end and said piston in leak-proof relation whereby air confined in said cylinder resiliently resists upward displacement of said wheel, and dynamic absorber mechanism disposed interiorly of said hollow piston to counteract high frequency oscillation of said wheel.

3. A vehicle suspension comprising a frame, lever means pivotally connected to said frame, a wheel rotatably mounted on said lever means, a cup-shaped member rigidly connected to said frame, a piston connected to said lever means for reciprocable movement in and out of said cup-shaped member, means forming a leak-proof juncture between said piston and said cup-shaped member to provide an air spring for resiliently suspending said frame relative to said wheel, means forming a cylindrical chamber in said piston, a guide rod disposed in said chamber in concentric relation therewith, an annular weight slidably disposed on said guide rod, and resilient means disposed between the ends of said cylindrical chamber and said weight adapted to normally yieldably center said weight intermediate of said cylindrical chamber, said resilient means being tuned to cause said weight to oscillate out of phase with the frequency of wheel hop oscillation to maintain the latter at a minimum.

4. A vehicle suspension comprising a frame, lever means pivotally connected to said frame, a wheel rotatably mounted on said lever means, an inverted cup-shaped member rigidly connected to said frame, a piston connected to said lever means for reciprocable movement in and out of said cup-shaped member, an annular resilient member forming a leak-proof juncture between said piston and said cup-shaped member to provide an air spring for resiliently suspending said frame relative to said wheel, means forming a cylindrical chamber in said piston, a guide rod disposed in said chamber in concentric relation therewith, an annular weight slidably disposed on said guide rod, and resilient means adapted to normally yieldably center the said weight intermediate of said cylindrical chamber, said resilient means being tuned to cause said weight to oscillate out of phase with the frequency of wheel hop oscillation to maintain the latter at a minimum.

5. A vehicle suspension comprising a frame, transversely extending vertically spaced upper and lower control arms pivoted at their inner ends to said frame, a wheel supporting member pivotally connected at the outer ends of said control arms, a wheel rotatably mounted on said supporting member, an inverted cup-shaped member rigidly connected to said frame, said member having a U-shaped peripheral flange, a piston pivotally connected to said lower control arm for reciprocable movement in and out of said cup-shaped member, an annular diaphragm secured in said flange and bonded to the upper surface of said piston to form a flexible leakproof connection between said piston and said cup-shaped member whereby air confined in said cup-shaped member resiliently suspends said frame relative to said wheel, means forming a closed cylindrical chamber in said piston, a guide rod disposed in said chamber in concentric relation therewith, an annular weight slidably disposed on said guide rod, and a pair of coil springs disposed at opposite sides of said weight to normally yieldably center the same intermediate of said cylindrical chamber, said coil springs being tuned to cause said weight to oscillate out of phase with the frequency of wheel hop oscillation.

References Cited in the file of this patent

UNITED STATES PATENTS

| | | |
|---|---|---|
| 1,077,472 | Hofmann | Nov. 4, 1913 |
| 2,115,072 | Hunt et al. | Apr. 26, 1938 |
| 2,216,327 | Smith | Oct. 1, 1940 |
| 2,333,095 | Dowty | Nov. 2, 1943 |
| 2,503,378 | Cornwell | Apr. 11, 1950 |
| 2,638,357 | Larison | May 12, 1953 |

FOREIGN PATENTS

| | | |
|---|---|---|
| 571,028 | Great Britain | Aug. 2, 1945 |